(12) United States Patent
Haas et al.

(10) Patent No.: US 12,337,498 B2
(45) Date of Patent: Jun. 24, 2025

(54) METHOD FOR OPERATING A HAND-GUIDED PROCESSING DEVICE, AND HAND-GUIDED PROCESSING DEVICE

(71) Applicant: Andreas Stihl AG & Co. KG, Waiblingen (DE)

(72) Inventors: Alexander Haas, Spraitbach (DE); Edgar Mueller, Ebersbach an der Fils (DE); Christian Nemec, Duernau (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 652 days.

(21) Appl. No.: 17/154,753

(22) Filed: Jan. 21, 2021

(65) Prior Publication Data

US 2021/0221022 A1 Jul. 22, 2021

(30) Foreign Application Priority Data

Jan. 22, 2020 (EP) ..................... 20153081

(51) Int. Cl.
*B27B 17/08* (2006.01)
*B25F 5/00* (2006.01)
(Continued)

(52) U.S. Cl.
CPC .............. *B27B 17/08* (2013.01); *B25F 5/001* (2013.01); *H02P 6/08* (2013.01); *H02P 6/12* (2013.01); *H02P 29/68* (2016.02)

(58) Field of Classification Search
CPC . B23D 47/12; H02P 29/68; H02P 6/12; H02P 6/08; B27B 17/08; B28D 1/045; B28D 7/005; B25F 5/001
(Continued)

(56) References Cited

U.S. PATENT DOCUMENTS

| 7,652,438 B2 | 1/2010 | Rosskamp |
| 9,873,193 B2 | 1/2018 | Gorenflo et al. |

(Continued)

FOREIGN PATENT DOCUMENTS

| CN | 201199679 Y | 2/2009 |
| CN | 108602182 A | 9/2018 |

(Continued)

OTHER PUBLICATIONS

German-language European Search Report issued in European Application No. 20153081.3 dated Jul. 17, 2020 with partial English translation (eight (8) pages).

(Continued)

*Primary Examiner* — Nhat Chieu Q Do
(74) *Attorney, Agent, or Firm* — Crowell & Moring LLP (57) ABSTRACT

A method is provided for operating a hand-guided processing device that has a rotating and/or circulating cutting tool, an electric motor drive system wherein the electric motor drive system is configured for generating a torque for driving the cutting tool, and a user-operable control element. The method automatically monitors whether a blocking criterion is fulfilled, wherein the blocking criterion is characteristic of a blocking of the cutting tool, and if the blocking criterion is fulfilled and the control element operated, automatically lowers the torque generated by the electric motor drive system, and temporally thereafter, automatically increases the torque generated by the electric motor drive system.

15 Claims, 5 Drawing Sheets

(51) Int. Cl.
*H02P 6/08* (2016.01)
*H02P 6/12* (2006.01)
*H02P 29/68* (2016.01)

(58) Field of Classification Search
USPC .......................................................... 83/13
See application file for complete search history.

(56) References Cited

U.S. PATENT DOCUMENTS

| | | | |
|---|---|---|---|
| 2007/0084613 A1 | 4/2007 | Zhang et al. | |
| 2008/0011102 A1 | 1/2008 | Schell et al. | |
| 2008/0110148 A1 | 5/2008 | Itoh et al. | |
| 2011/0167651 A1* | 7/2011 | Tokunaga | B23D 47/12 30/388 |
| 2012/0103643 A1 | 5/2012 | Binder et al. | |
| 2015/0223401 A1 | 8/2015 | Schiedt | |
| 2015/0342702 A1* | 12/2015 | Borgschulte | A61C 5/40 433/101 |
| 2016/0151845 A1 | 6/2016 | Yamamoto et al. | |
| 2016/0342151 A1 | 11/2016 | Dey, IV et al. | |
| 2019/0013762 A1 | 1/2019 | Yamaguchi et al. | |
| 2020/0078876 A1* | 3/2020 | Okouchi | B25F 5/02 |

FOREIGN PATENT DOCUMENTS

| | | |
|---|---|---|
| DE | 10 2006 062 354 A1 | 6/2008 |
| DE | 10 2013 021 832 A1 | 6/2015 |
| DE | 10 2014 206 268 A1 | 10/2015 |
| JP | 10-43617 A | 2/1998 |
| WO | WO 2015/011955 A1 | 1/2015 |

OTHER PUBLICATIONS

Chinese-language Office Action issued in Chinese Application No. 202110087550.1 dated Feb. 25, 2025 with partial English translation (25 pages).

* cited by examiner

METHOD FOR OPERATING A HAND-GUIDED PROCESSING DEVICE, AND HAND-GUIDED PROCESSING DEVICE

CROSS REFERENCE TO RELATED APPLICATION

This application claims priority under 35 U.S.C. § 119 from European Patent Application No. 20153081.3, filed Jan. 22, 2020, the entire disclosure of which is herein expressly incorporated by reference.

BACKGROUND AND SUMMARY OF THE INVENTION

The invention concerns a method for operating a hand-guided processing device, and a hand-guided processing device.

The object of the invention is to provide a method for operating a hand-guided processing device, and a hand-guided processing device, which each have improved properties.

The invention achieves this object by providing a method and a hand-guided processing device with the features according to the independent claims. Advantageous refinements and/or embodiments of the invention are described in the dependent claims.

The in particular automatic method according to the invention is designed or configured in particular for automatic operation of a hand-guided processing device. The processing device has a rotating and/or circulating or rotatory cutting tool, an electric motor drive system, and a user-operable control element. The electric motor drive system is designed or configured for generating a torque for driving the cutting tool, in particular in rotation and/or circulation. The method comprises the steps: a) a automatically or autonomously monitoring whether, in particular or not, a blocking criterion or seizing criterion is fulfilled, in particular independently of a user of the processing device. The blocking criterion is characteristic of a blocking of the cutting tool; b) if or while the blocking criterion is fulfilled and the control element operated, automatically or autonomously lowering the torque generated by the electric motor drive system, and temporally thereafter, automatically or autonomously increasing the torque generated by the electric motor drive system, in particular independently of operation of the control element by the user.

During operation of the processing device, in particular in rotation and/or circulation of the cutting tool, the cutting tool may be blocked or seized by a processing piece to be cut or by a solid object in the processing piece, in particular if the advance force is too high. With the method, the cutting tool may be drawn free automatically, without control or regulation by the user. This allows the blocking of the cutting tool to be automatically released. Additionally or alternatively, thus the user may perceive the blocking in particular haptically and/or acoustically, and hence relieve the load on the cutting tool, in particular reduce an advance force. This allows the blocking of the cutting tool to be released. In particular, thus a user of the processing device need not change, in particular interrupt, the operation of the control element.

In particular, the method may be described as an override function.

The processing device may be a ground-guided or hand-carried processing device. In addition or alternatively, a hand-guided, in particular hand-carried processing device, may mean that the processing device may have a mass of maximum 50 kilogrammes (kg), in particular maximum 20 kg, in particular maximum 10 kg, in particular maximum 5 kg, and/or minimum 1 kg, in particular minimum 2 kg. Further additionally or alternatively, the processing device may be a gardening, forestry and/or construction processing device.

The method and/or the processing device, in particular the electric motor drive system, may be configured for rotation and/or circulation of the cutting tool in one, in particular only one, in particular a single direction, in particular one rotational direction. In other words, the method and/or the processing device, in particular the electric motor drive system, need not or may not be configured for rotation and/or circulation of the cutting tool in the opposite direction or for a reversal of direction, in particular if the blocking criterion is fulfilled. Further additionally or alternatively, the rotation and/or circulation may describe the form of a closed curve.

The method and/or the processing device, in particular the electric motor drive system, may be configured for generating the torque dependently of operation of the control element. Additionally or alternatively, the method and/or the processing device, in particular the electric motor drive system, may be configured to detect whether, in particular or not, the control element is operated by means of a switch of the processing device. In particular, the control element may be configured for operating the switch.

The processing device need not or may not comprise an internal combustion engine drive system.

The method may be executed if the processing device is switched on. In other words, the method need not or may not be executed if the processing device is not switched on or is switched off. In addition or alternatively, step a) may be executed if the control element is operated. In other words, step a) need not or may not be executed if the control element is not operated. Further additionally or alternatively, step a) may be executed persistently. Further additionally or alternatively, step b) need not or may not be executed if the blocking criterion is not fulfilled and/or the control element is not operated. In other words, step b) may be executed until the blocking criterion is no longer fulfilled. Further additionally or alternatively, step b) may be executed at the same time as and/or temporally after step a).

In step b), the torque may be lowered from a value for the case where the blocking criterion is not fulfilled. In addition or alternatively, the electric motor drive system may be configured for generating the torque by means of pulse duration modulation, in particular pulse width modulation. In step b), the lowering and/or increasing of the pulse duration modulation may be different, and/or may extend temporally over several pulses of the pulse duration modulation.

Automatically may mean independently of the user, in particular of the operation of the control element by the user.

In a refinement of the invention, the processing device is a saw, in particular a chain saw, a brush cutter, a lawn mower, a stone cutter or a cutting grinder. Alternatively or additionally, the cutting tool comprises a saw chain, a saw blade, a cutting blade, a cutting knife, a grinding chain or a grinding disc. In particular, the cutting tool is a saw chain, a saw blade, a cutting blade, a cutting knife, a grinding chain or a grinding disc.

In a refinement of the invention, the electric motor drive system, in particular a rotor of the electric motor drive system, and the cutting tool are coupled or connected together, without a clutch, in particular rotationally fixedly, in particular mechanically. This allows the torque generated by the electric motor drive system to be transmitted slip-free to the cutting tool.

In a refinement of the invention, the blocking criterion is that despite the in particular maximally operated control element and/or despite the in particular maximally generated torque being greater than zero and/or despite a current effecting the in particular maximum torque being greater than zero, a rotational speed of the electric motor drive system and/or the cutting tool is equal to or less than a blocking rotational speed lower limit value. This allows the blockage of the cutting tool to be detected or monitored. In particular, the blocking rotational speed lower limit value may be smaller than a normal value of the rotational speed for the case when the cutting tool is not blocked. In particular, the blocking rotational speed lower limit value may be zero. Additionally or alternatively, the method and/or the processing device, in particular the electric motor drive system, for controlling or regulating a nominal rotational speed of the electric motor drive system or the cutting tool may be configured only greater, in particular no smaller, than the blocking rotational speed lower limit value. Further additionally or alternatively, the rotational speed or the rotation and/or the circulation of the electric motor drive system and/or the cutting tool may be, in particular defined, in relation to a housing of the processing device and/or a handle of the processing device and/or the control element.

In a refinement of the invention, step b) is repeated automatically or autonomously, in particular until a repetition number limit value is reached, in particular independently of the operation of the control element by the user. This allows a particularly high probability that the blockage of the cutting tool can be released. Additionally or alternatively, thus the user may perceive the blockage particularly clearly. In particular, the repetition number limit value may be fixedly set in the factory and/or be user-adjustable. Additionally or alternatively, step b) need not or may not be repeated again when the repetition number limit value is reached.

In a refinement, in particular in one embodiment of the invention, the automatic lowering, in particular in step b), is performed with a lowering duration of at least 1 millisecond (ms), in particular at least 20 ms, and/or at most 2 seconds(s), in particular at most 500 ms, in particular 50 ms. Additionally or alternatively, the automatic increasing, in particular in step b), is performed with an increase duration of at least 1 ms, in particular at least 20 ms, and/or at most 2 s, in particular at most 500 ms, in particular 50 ms. Further additionally or alternatively, the automatic increasing, in particular in step b), is carried out temporally after a pause duration of at least 1 ms, in particular at least 20 ms, and/or at most 2 s, in particular at most 500 ms, in particular 250 ms, temporally after the automatic lowering, in particular in step b). Further additionally or alternatively, on repetition of step b), where applicable, the automatic lowering, in particular of step b), is carried out temporally after a holding duration of at least 0 ms and/or at most 2 s, in particular at most 500 ms, temporally after the automatic increasing, in particular in step b). This allows the user to perceive the blocking particularly clearly. Additionally or alternatively, this, in particular the increase duration, allows a particularly high probability that the blocking of the cutting tool can be released. In particular, the lowering duration and/or the increase duration may each be temporally longer than pulses of the pulse duration modulation where present. In particular, the pulses may have a pulse duration of approximately 62.5 microseconds (equal to 16 Kilohertz).

In a refinement of the invention, the method comprises the step: c) if or while the blocking criterion is not fulfilled and the control element is operated, automatically or autonomously controlling or regulating the torque generated by the electric motor drive system for reaching of a nominal rotational speed, in particular a value of the nominal rotational speed, of the electric motor drive system and/or the cutting tool, in particular independently of the operation of the control element by the user. This allows the cutting tool to be able to cut through the processing piece to be cut. In particular, step c) need not or may not be performed if the blocking criterion is fulfilled and/or the control element is not operated. In other words, step c) may be executed until the blocking criterion is fulfilled. Additionally or alternatively, step c) may be executed temporally before and/or temporally after step b). In other words, at any time either step c) or step b) may be executed. Further additionally or alternatively, step c) may be executed at the same time as and/or temporally after step a). Further additionally or alternatively, in step b) the torque may be lowered from a value for reaching the nominal rotational speed, in particular of a temporally preceding step c). Further additionally or alternatively, the nominal rotational speed may be dependent of operation of the control element.

In one embodiment of the invention, a non-blocking rotational speed lower limit value for the nominal rotational speed, in particular of step c), is greater, in particular at least twice as great, as the blocking rotational speed lower limit value. This allows avoidance of the blocking criterion being fulfilled despite a non-blocking of the cutting tool.

In one embodiment of the invention, in step c), an automatic or autonomous increasing of the generated torque or a current effecting the torque is limited to a non-blocking upper limit value, in particular independently of the operation of the control element by the user. In particular in step b), the torque or the current is lowered from the non-blocking upper limit value. In addition or alternatively, in step b), the automatic increasing of the generated torque or current is limited to a blocking upper limit value. Further additionally or alternatively, in step b), the automatic lowering of the generated torque or current is limited to a blocking lower limit value greater than zero. In particular, the blocking lower limit value is at least 0.1 times and/or at most 0.25 times the blocking upper limit value. The non-blocking upper limit value and/or the blocking upper limit value allows/allow avoidance of an overload of the electric motor drive system and/or cutting tool. In addition or alternatively, the blocking lower limit value greater than zero allows a particularly high probability that the cutting tool can be drawn free. Further additionally or alternatively, the blocking lower limit value greater than zero allows the user to perceive the operation of the processing device, in particular the electric motor drive system. Further additionally or alternatively, the blocking lower limit value greater than zero allows an in particular indirect detection of a setting or position of a rotor of the electric motor drive system or the cutting tool, by use of current and/or voltage information from the electric motor drive system, in particular without a sensor for directly detecting the position, in particular in comparison with a blocking lower limit value equal to zero. In particular, the blocking upper limit value may be greater than, equal to or less than the non-blocking upper limit value.

In one embodiment of the invention, the blocking upper limit value is dependent on a number of repetitions of step b); in particular the blocking upper limit value is reduced, in particular automatically, depending on a number of repetitions of step b). This allows avoidance of an overload of the electric motor drive system and/or the cutting tool.

In one embodiment of the invention, the method comprises the step of detecting, in particular automatically detecting, in particular monitoring, a temperature, in particular a temperature value, of the electric motor drive system and/or of an accumulator electrically connected to the processing device. The repetition number limit value, the non-blocking upper limit value and/or the blocking upper limit value is/are dependent on the detected temperature. In particular, the repetition number limit value, the non-blocking upper limit value and/or the blocking upper limit value are adjusted, in particular reduced, in particular automatically, depending on the detected temperature. This allows avoidance of an overload and/or shut-down of the electric motor drive system and/or accumulator. In particular, the temperature may be that of an electronics, in particular a power electronics, and/or an electric motor of the electric motor drive system. Additionally or alternatively, the accumulator may be configured to supply the processing device, in particular the electric motor drive system, with electric drive power. Further additionally or alternatively, the repetition number limit value, the non-blocking upper limit value and/or the blocking upper limit value may be reduced when the detected temperature reaches and/or exceeds a temperature limit value.

In one embodiment of the invention, the processing device is designed or configured for electrical connection to various types of accumulators. The various types of accumulators have different maximum current values. The processing device is electrically connected to one of the various types of accumulators. The method comprises the step: detecting, in particular automatically, the type of the electrically connected accumulator and determining, in particular automatically, the maximum current value on the basis of the detected type; and/or detecting, in particular automatically, the maximum current value of the electrically connected accumulator. The non-blocking upper limit value and/or the blocking upper limit value is/are dependent on the maximum current value. In particular, the non-blocking upper limit value and/or the blocking upper limit value is/are adjusted, in particular automatically, depending on the maximum current value. This allows avoidance of an overload and/or shut-down of the accumulator. In particular, the accumulator may be configured to supply the processing device, in particular the electric motor drive system, with electric drive power. In addition or alternatively, the non-blocking upper limit value and/or the blocking upper limit value may be less than or equal to the maximum current value.

In a refinement, in particular in one embodiment of the invention, the control element is user-adjustable. In step c), where applicable, the nominal rotational speed is dependent on an adjustment or a setting, in particular a value of the setting, of the control element. In addition or alternatively, step b) comprises: if or while the control element is set at least in a starting setting or position, in particular to at least ten percent (10%), in particular at least 20%, in particular at least 50%, in particular 100%, in particular of an adjustment range or adjustment travel of the control element, automatically lowering the torque generated by the electric motor drive system, and temporally thereafter, automatically increasing the torque generated by the electric motor drive system, in particular independently of the setting of the control element in at least the starting position. In particular, the control element may have at least three different positions. In particular, the control element may be steplessly user-adjustable. Additionally or alternatively, the method and/or the processing device, in particular the electric motor drive system, may be configured to detect the setting of the control element by means of a potentiometer of the processing device. In particular, the control element may be configured to adjust the potentiometer. Further additionally or alternatively, the starting position for starting the torque generation may be greater than zero or 0%.

In a refinement of the invention, step b) comprises: output, in particular automatic output, in particular display, of a user-perceptible blocking signal. Thus the user can perceive the blocking particularly well.

The hand-guided processing device according to the invention comprises a rotating and/or circulating, in particular the rotating and/or circulating, cutting tool, in particular the electric motor drive system; a user-operable, in particular the user-operable control element; and an in particular electric monitoring and control device. The electric motor drive system is designed or configured for generating a, in particular the, torque for driving the cutting tool. The monitoring and control device is designed or configured for automatically monitoring whether a, in particular the, blocking criterion is fulfilled. The blocking criterion is characteristic of a, in particular the, blocking of the cutting tool. Furthermore, the monitoring and control device is designed or configured, if the blocking criterion is fulfilled and the control element operated, for automatically lowering the torque generated by the electric motor drive system, and temporally thereafter, automatically increasing the torque generated by the electric motor drive system.

The processing device may allow the same advantages as for the method described above.

In particular, the processing device, in particular the monitoring and control device, may be designed or configured for executing a method as described above. In addition or alternatively, the processing device may be designed or configured as described above for the method. Further additionally or alternatively, the monitoring and control device may comprise, in particular may be a microcontroller.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
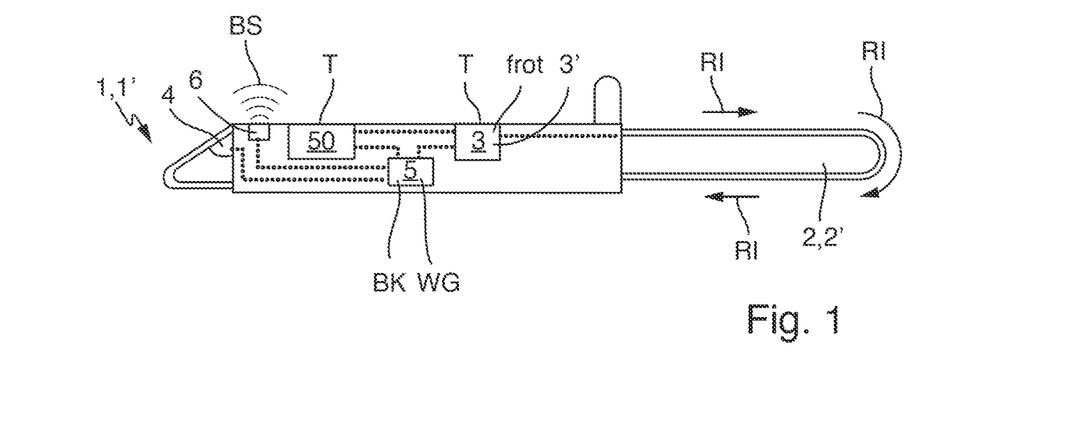
FIG. 1 shows schematically a hand-guided processing device according to an embodiment of the invention.
Figure 2:
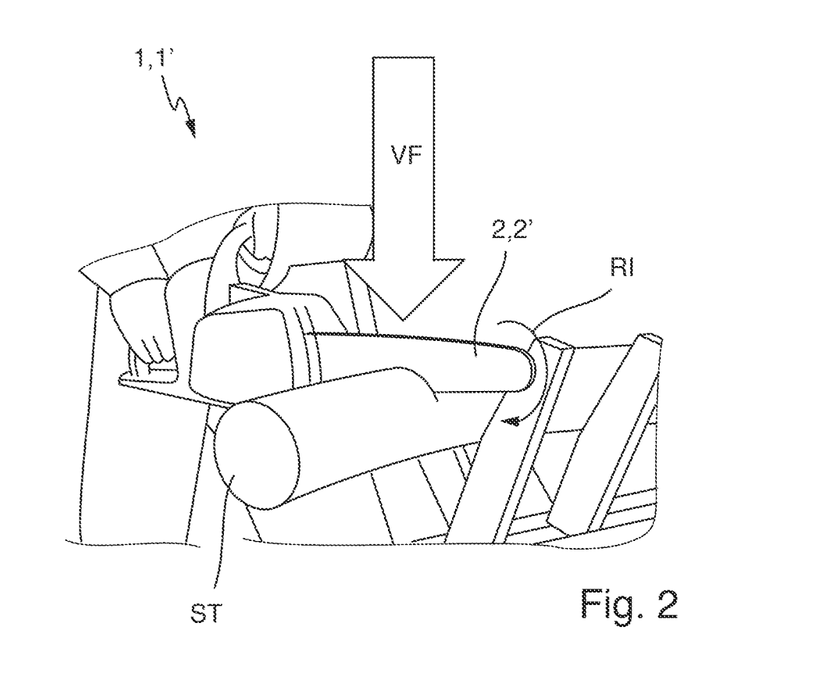
FIG. 2 shows the processing device from FIG. 1 with a cutting tool during cutting of a processing piece to be cut.
Figure 3:
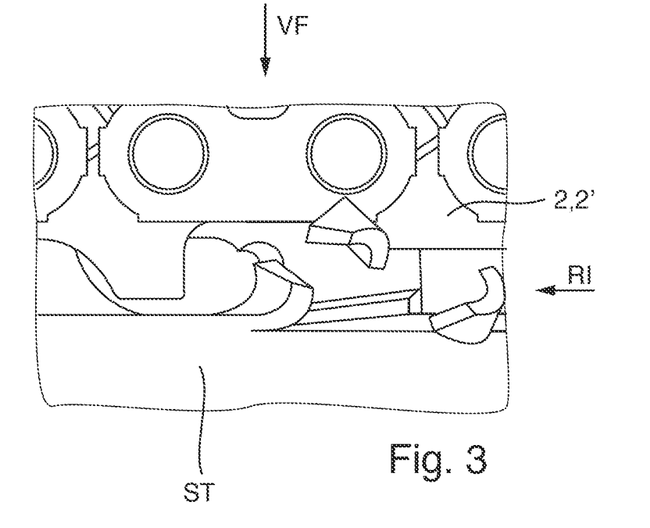
FIG. 3 shows the processing device from FIG. 1 with the cutting tool blocked by the processing piece from FIG. 2.
Figure 6:
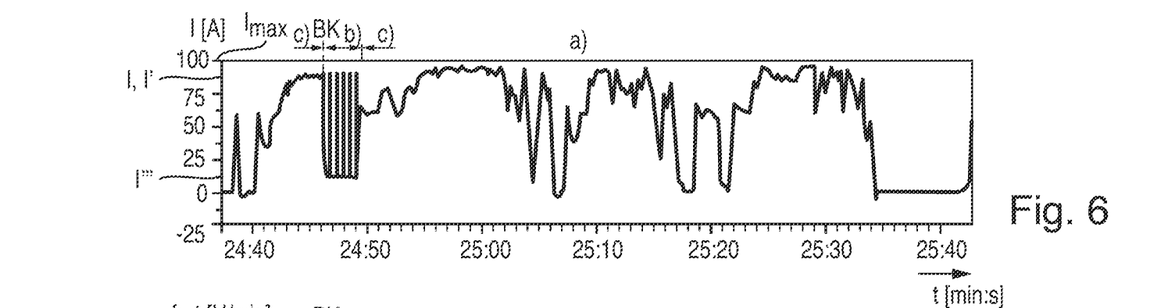
FIG. 6 is a further flow diagram, in particular a further graph of the current of the electric motor drive system over time, of the exemplary method according to the invention.
Figure 7:
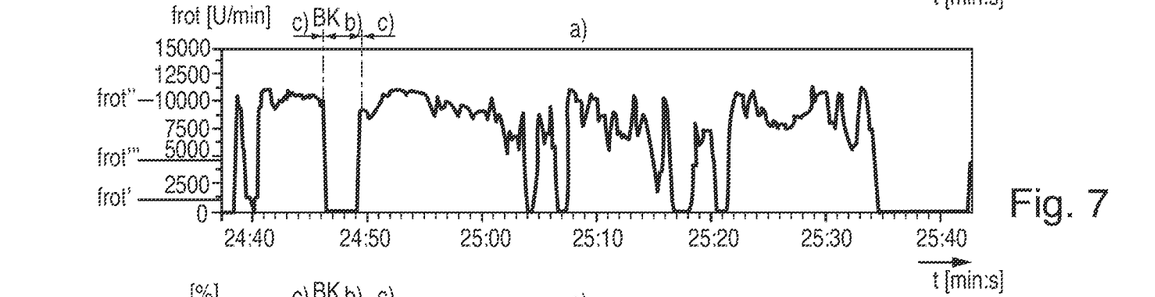
FIG. 7 is yet a further flow diagram, in particular a graph of a rotational speed of the electric motor drive system over time, of the exemplary method according to the invention.
Figure 8:
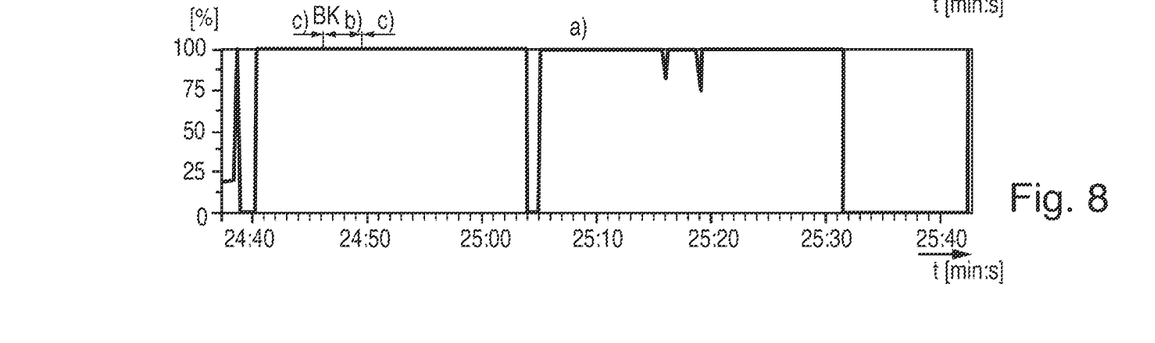
FIG. 8 is yet a further flow diagram, in particular a graph of operation of a control element of the processing device from FIG. 1 over time, of the exemplary method according to the invention.
Figure 9:
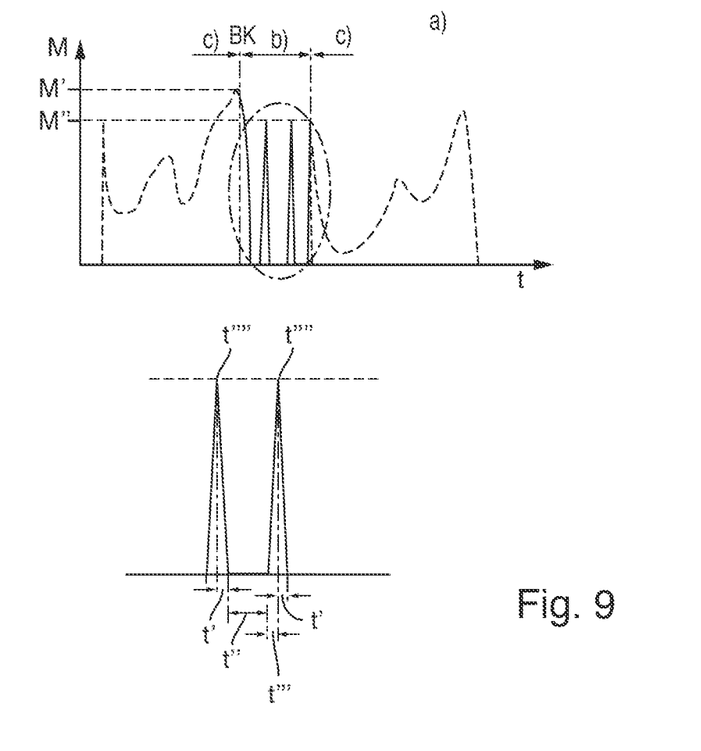
FIG. 9 is yet a further flow diagram, in particular a graph of a torque generated by the electric motor drive system over time, of the exemplary method according to the invention.
Figure 10:
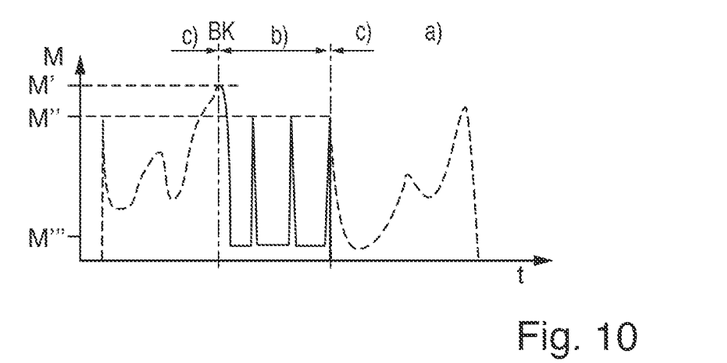
FIG. 10 is yet a further flow diagram, in particular a further graph of the torque generated by the electric motor drive system over time, of the exemplary method according to the invention.

FIGS. 1 to 3 show a hand-guided processing device 1. The processing device 1 comprises a rotating and/or circulating cutting tool 2, an electric motor drive system 3, a user-operable control element 4, and a monitoring and control device 5. The electric motor drive system 3 is configured for generating a torque M, as shown in FIGS. 9 and 10, for driving the cutting tool 2, as shown in FIGS. 2 and 7, in particular generates this and drives this. The monitoring and control device 5 is configured for automatic monitoring of whether a blocking criterion BK is fulfilled, as shown in FIGS. 5 to 10, in particular monitors this. The blocking criterion BK is characteristic of a blocking of the cutting tool 2, as shown in FIG. 3. Furthermore, the monitoring and control device 5 is configured, if the blocking criterion BK is fulfilled and the control element 4 operated, to automatically lower the torque M generated by the electric motor drive system 3, and in particular lowers this, and temporally thereafter, to automatically increase the torque M generated by the electric motor drive system 3, and in particular increases this.

FIGS. 1 to 3 and 5 to 10 show a method for operating the hand-guided processing device 1. The method comprises the steps: a) automatically monitoring whether the blocking criterion BK is fulfilled, in particular by means of the monitoring and control device 5. The blocking criterion BK is characteristic of the blocking of the cutting tool 2. b) If or while the blocking criterion BK is fulfilled and the control element 4 operated, automatically lowering the torque M generated by the electric motor drive system 3, and temporally thereafter, automatically increasing the torque M generated by the electric motor drive system 3, in particular by means of the monitoring and control device 5.

In detail, the electric drive system 3, in particular a rotor 3' of the electric motor drive system 3, and the cutting tool 2, are coupled together without a clutch, in particular rotationally fixedly.

Furthermore, in the exemplary embodiment shown, the processing device 1 is a saw 1', in particular a chain saw, and the cutting tool 2 comprises a saw chain 2', in particular is a saw chain 2'.

During operation of the processing device 1, in the exemplary embodiment shown, the saw 1', in particular the electric motor drive system 3, rotates, and/or in the exemplary embodiment shown, the cutting tool 2, in particular the saw chain 2', circulates, in particular in a direction RI, if the cutting tool 2 is not blocked, as shown in FIG. 2.

During cutting of a processing piece ST to be cut, in the exemplary embodiment shown a wooden tree trunk, the cutting tool 2, in the exemplary embodiment shown a saw tooth of the cutting tool 2, may be blocked by the processing piece ST, in particular if the advance force VF is too high, as shown in FIG. 3.

Figure 4:
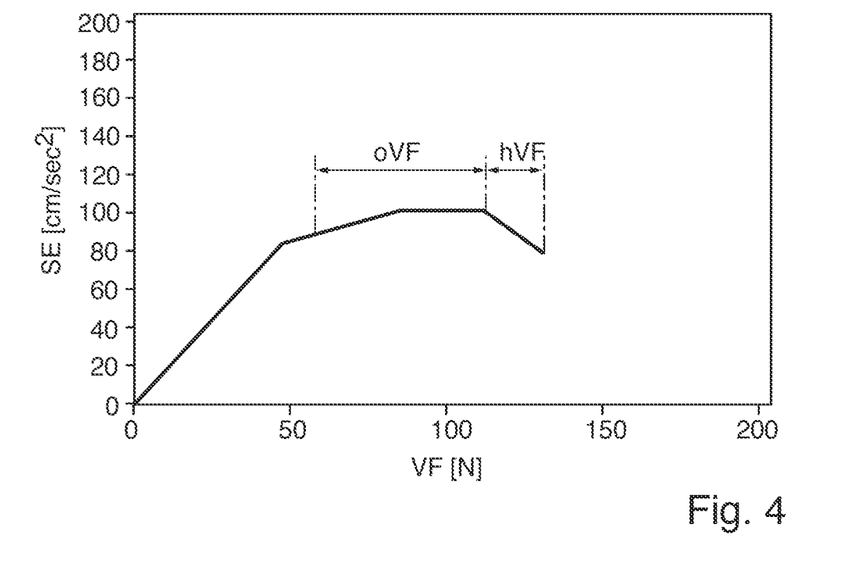
FIG. 4 is a graph of the cut result over an advance force of the processing device from FIG. 1.

FIG. 4 shows a graph of a cutting result SE over the advance force VF. In detail, a region of optimal advance force oVF is shown, and a region of excessively high advance force hVF. If the advance force hVF is too high, the cutting tool 2 is blocked or does not rotate and/or circulate. This leads to a fall in a rotational speed frot of the electric motor drive system 3 and/or cutting tool 2, in particular to zero, as shown in FIG. 6 at time t 24:46 min:s.

Also, the fluctuations in rotational speed frot occur, for example at times t 24:40 min:s to 24:46 min:s, and 24:49 min:s to 25:04 min:s, due to the varying load, for example under different advance forces VF, i.e. if the user presses the processing device 1 more strongly or less strongly into the processing piece ST.

The blocking criterion BK is, above all, that despite the operated control element 4 and/or despite the generated torque M being greater than zero, and/or despite a current I effecting the torque M being greater than zero, the rotational speed frot of the electric motor drive system 3 and/or the cutting tool 2 is less than and/or equal to a blocking rotational speed lower limit value frot', as shown in FIGS. 5 to 10, in particular for a time t 24:46 min:s.

In particular, the blocking rotational speed lower limit value frot' is at least zero, in particular at least 1000 revolutions per minute (rpm) and/or at most 3000 rpm, in particular at most 2000 rpm, in the exemplary embodiment shown 1500 rpm.

Also, the method comprises the step c): if the blocking criterion BK is not fulfilled and the control element 4 is operated, automatically controlling or automatically regulating the torque M generated by the electric motor drive system 3 for reaching a nominal rotational speed frot" of the electric motor drive system 3 and/or the cutting tool 2, in particular by means of the monitoring and control device 5.

In detail, a non-blocking rotational speed lower limit value frot''' for the nominal rotational speed frot" is greater than the blocking rotational speed lower limit value frot'.

In particular, the non-blocking rotational speed lower limit value frot''' is at least 3500 rpm and/or at most 5500 rpm, in the exemplary embodiment shown 4500 rpm. Thus in the exemplary embodiment shown, the non-blocking rotational speed lower limit value frot''' is three times greater than the blocking rotational speed lower limit value frot'.

Furthermore, the control element 4 is user-adjustable.

In step c), the nominal rotational speed frot" is dependent on a setting of the control element 4.

In the exemplary embodiment shown, the nominal rotational speed frot" is 10,000 rpm for a 100% setting of the control element 4.

In addition, step b) comprises: if the control element is set at least in a starting position, in particular at least 50%, automatically lowering the torque M generated by the electric motor drive system 3, and temporally thereafter, automatically increasing the torque M generated by the electric motor drive system 3, in particular independently of the position of the control element 4 in at least the starting position.

Also in step c), an automatic increase of the generated torque M or the current I effecting the torque M is limited to a non-blocking upper limit value M', I', as shown in FIGS. 5, 6, 9 and 10. In particular, in step b), the torque M or the current I is lowered from the non-blocking upper limit value M', I'.

In the exemplary embodiment shown, the non-blocking upper limit value I' is 87.5 Ampere (A).

In addition, in step b), the automatic increase in the generated torque M or current I is limited to a blocking upper limit value M", I".

In the exemplary embodiment shown, the blocking upper limit value I" is 87.5 A.

Further additionally, in the variant of the exemplary embodiment shown in FIGS. 6 and 10, in step b), the automatic lowering of the generated torque M or current is limited to a blocking lower limit value M'", I'" greater than zero.

In the exemplary embodiment shown, the blocking lower limit value I'" is 12.5 A.

Figure 5:
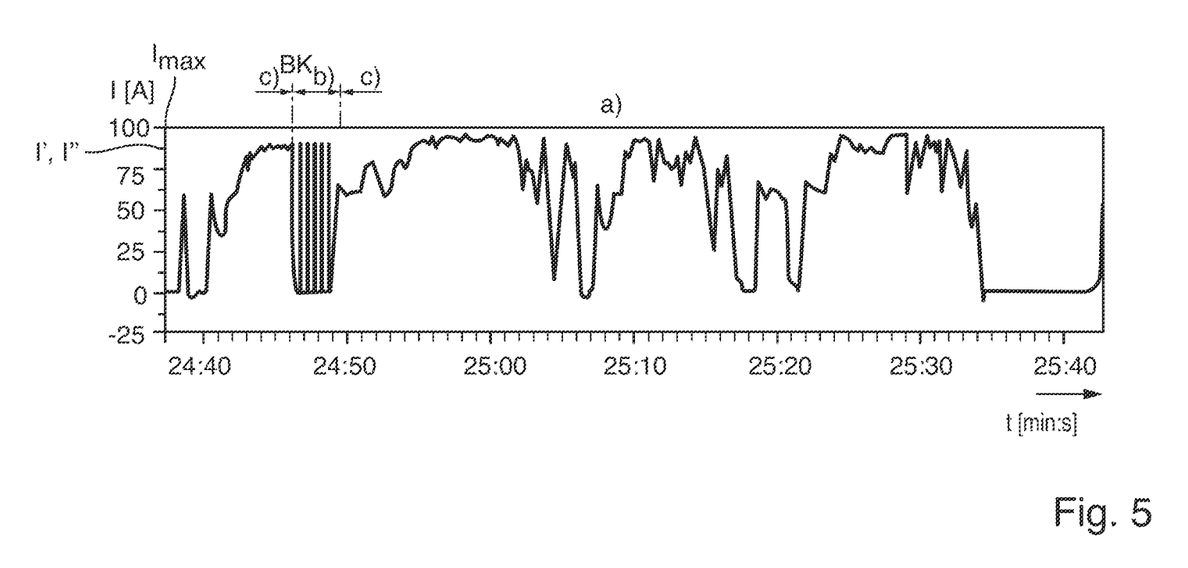
FIG. 5 is a flow diagram, in particular a graph of a current of an electric motor drive system of the processing device from FIG. 1 over time, of an exemplary method according to the invention for operating the processing device from FIG. 1.

In the variant of the exemplary embodiment shown in FIGS. 5 and 9, in step b), the generated torque M and/or the current I is/are lowered to zero.

Furthermore, step b) is repeated automatically, in particular until reaching a repetition number limit value WG, in the exemplary embodiment a maximum of nine.

Also, the blocking upper limit value M', I' is dependent on a number of repetitions of step b). In particular, the blocking upper limit value M', I' is reduced depending on a number of repetitions of step b), for example temporally after the fourth repetition, in particular by means of the monitoring and control device 5.

Furthermore, the method comprises the step: detecting a temperature T of the electric motor drive system 3 and/or an accumulator 50 electrically connected to the processing device 1, in particular by means of the monitoring and control device 5. The repetition number limit value WG, the non-blocking upper limit value M', I' and/or the blocking upper limit value M", I", is/are dependent on the detected temperature T. In particular, the repetition number limit value WG, the non-blocking upper limit value M', I' and/or the blocking upper limit value M", I" is/are set, in particular reduced, depending on the detected temperature T, in particular by means of the monitoring and control device 5.

Also, the processing device 1 is configured for electrical connection to various types of accumulators 50. The various types of accumulators 50 have different maximum current values Imax. The processing device 1 is electrically connected to one of the various types of accumulators 50. The method comprises the step: detecting the type of the electrically connected accumulator 50 and determining the maximum current value Imax on the basis of the detected type; and/or detecting the maximum current value Imax of the electrically connected accumulator 50, in particular by means of the monitoring and control device 5. The non-blocking upper limit value M', I' and/or the blocking upper limit value M", I" is/are dependent on the maximum current value Imax. In particular, the non-blocking upper limit value M', I' and/or the blocking upper limit value M", I" is/are adjusted depending on the maximum current value Imax, in particular by means of the monitoring and control device 5.

In the exemplary embodiment shown, the maximum current value Imax is 100 A.

Furthermore, the automatic lowering is carried out with a lowering duration t' of at least 1 ms and/or at most 2 s, in the exemplary embodiment shown 50 ms.

In addition, the automatic increase is carried out with an increase duration t'" of at least 1 ms and/or at most 2 s, in the exemplary embodiment shown 50 ms.

Further additionally, the automatic increase is carried out temporally after a pause duration t" of at least 1 ms and/or at most 2 s, in the exemplary embodiment shown 250 ms, temporally after the automatic lowering.

Further additionally, on repetition of step b), the automatic lowering is carried out temporally after a holding duration t"" of at least 0 ms and/or at most 2 s, in the exemplary embodiment shown 0 ms, temporally after the automatic increase.

Also, step b) comprises: output, in particular display, of a user-perceptible blocking signal BS, in particular by means of an output device 6 of the processing device 1.

In the exemplary embodiment shown, the output device 6 has an LED which flashes in step b).

In the exemplary embodiment shown, the blocking criterion BK is not fulfilled until time t 24:46 min:s, and the control element 4 is operated. Thus step c) is executed.

From time t 24:46 min:s, the blocking criterion BK is fulfilled and the control element 4 operated. Thus step b) is executed, in particular multiple times.

This allows the user to be able to perceive the blocking and hence relieve the load on the cutting tool 2. Thus it allows the blocking of the cutting tool 2 to be released.

From time t 24:49 min:s, the blocking criterion BK is not, in particular is no longer, fulfilled and the control element 4 is operated. Thus step c) is executed.

In particular, during the entire time portion, in particular from t 24:46 min:s to 24:49 min:s, the control element 4 is operated, in particular set at least in the starting position.

As the exemplary embodiments shown and explained above illustrate, the invention provides an advantageous method for operating a hand-guided processing device and an advantageous hand-guided processing device, each of which has improved properties.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operation of a hand-guided processing device, wherein the processing device comprises:
 a rotating or circulating cutting tool;
 an electric motor drive system, wherein:
  the electric motor drive system is configured for generating a torque for driving the cutting tool;
 a monitoring and control device; and
 a user-operable control element configured to be user-adjustable,
 wherein the method comprises the steps of:
  a) using the monitoring and control device to automatically monitor whether a blocking criterion is fulfilled, wherein:
   the blocking criterion is characteristic of a processing piece to be cut by the cutting tool causing movement of the cutting tool to be at least one of blocked or seized;
  b) in response to the blocking criterion being fulfilled and the control element being operated, using the monitoring and control device to automatically lower the torque generated by the electric motor drive system that drives the cutting tool while the blocking criterion is fulfilled, and subsequently, automatically increase the torque generated by the electric motor drive system that drives the cutting tool; and
  c) in response to the blocking criterion not being fulfilled and the control element is operated, automatically controlling or regulating the torque generated by the electric motor drive system for reaching a nominal rotational speed of at least one of the electric motor drive system or the cutting tool, where the nominal rotational speed is based on a setting associated with the user-operable control element set by a user, wherein:
a non-blocking rotational speed lower limit value for the nominal rotational speed is at least twice as great as greater than a blocking rotational speed lower limit value;
wherein the processing device is at least one of a gardening, forestry, or construction processing device, and
wherein the blocking criterion is that while the control element is operated, the generated torque driving the cutting tool is greater than zero, and current effecting the torque is greater than zero, at least one of a rotational speed of the electric motor drive system is less than or equal to the blocking rotational speed lower limit value or a rotational speed of the cutting tool is less than or equal to the blocking rotational speed lower limit value.

2. The method according to claim 1, wherein at least one of:
the processing device is a chain saw; or
the cutting tool comprises a saw chain.

3. The method according to claim 1, wherein:
the electric motor drive system and the cutting tool are coupled together without a clutch.

4. The method according to claim 1,
wherein step b) is repeated automatically until a repetition number limit value is reached.

5. The method according to claim 4, wherein at least one of:
the automatic lowering is performed with a lowering duration of at least 1 ms and/or at most 2 s, or
the automatic increasing is performed with an increase duration of at least 1 ms and/or at most 2 s, or
the automatic increasing is performed after a pause duration of at least 1 ms and/or at most 2 s after the automatic lowering, or
on repetition of step b), the automatic lowering is carried out after a holding duration of at least 0 ms and/or at most 2 s after the automatic increasing.

6. The method according to claim 4, wherein the method further comprises the steps of:
detecting a temperature of the electric motor drive system and/or of an accumulator electrically connected to the processing device, wherein
the repetition number limit value, the non-blocking upper limit value and/or the blocking upper limit value is/are adjusted dependent on the detected temperature.

7. The method according to claim 1, further comprising the step of:
c) in response to the blocking criterion not being fulfilled and the control element is operated, automatically controlling or regulating the torque generated by the electric motor drive system for reaching a nominal rotational speed of the electric motor drive system and/or the cutting tool.

8. The method according to claim 7,
wherein step b) further comprises: in response to the control element being set at least in a starting position to at least 10%, automatically lowering the torque generated by the electric motor drive system, and subsequently, automatically increasing the torque generated by the electric motor drive system independently of the setting of the control element in at least the starting position.

9. The method according to claim 7, wherein at least one of:
in step c), an automatic increasing of the generated torque or a current effecting the torque is limited to a non-blocking upper limit value, and wherein
in step b), the torque or the current is lowered from the non-blocking upper limit value, or
in step b), the automatic increasing of the generated torque or current is limited to a blocking upper limit value, or
in step b), the automatic lowering of the generated torque or current is limited to a blocking lower limit value greater than zero, wherein
the blocking lower limit value is at least 0.1 times and/or at most 0.25 times the blocking upper limit value.

10. The method according to claim 9, wherein
step b) is repeated automatically until a repetition number limit value is reached, wherein
the blocking upper limit value is reduced dependent on a number of repetitions of step b).

11. The method according to any of claim 9,
wherein the processing device is configured for electrical connection to various types of accumulators, wherein the various types of accumulators have different maximum current values, wherein the processing device is electrically connected to one of the various types of accumulators,
wherein the method further comprises the step of:
detecting the type of the electrically connected accumulator and determining the maximum current value based on the detected type, and/or detecting the maximum current value of the electrically connected accumulator, and
wherein the non-blocking upper limit value and/or the blocking upper limit value is/are adjusted dependent on the maximum current value.

12. The method according to claim 1,
wherein step b) further comprises: outputting a user-perceptible blocking signal.

13. The method of claim 1, wherein the blocking rotational speed lower limit value is zero.

14. A hand-guided processing device, comprising;
a rotating or circulating cutting tool;
an electric motor drive system, wherein the electric motor drive system is configured for generating a torque for driving the cutting tool;
a user-operable control element configured to be user-adjustable; and
a monitoring and control device, wherein the monitoring and control device is operatively configured to:
automatically monitor whether a blocking criterion is fulfilled, wherein the blocking criterion is characteristic of a processing piece to be cut by the cutting tool causing movement of the cutting tool to be at least one of blocked or seized, and
in response to the blocking criterion being fulfilled and the control element being operated, automatically lower the torque generated by the electric motor drive system that drives the cutting tool while the blocking criterion is fulfilled, and subsequently, automatically increase the torque generated by the electric motor drive system that drives the cutting tool, in response to the blocking criterion not being fulfilled and the control element is operated, automatically control or regulate the torque generated by the electric motor drive system for reaching a nominal rotational speed of at least one of the electric motor drive system or the cutting tool, where the nominal rotational speed is based on a setting associated with the user-operable control element set by a user;

wherein a non-blocking rotational speed lower limit value for the nominal rotational speed is at least twice as great as greater than a blocking rotational speed lower limit value, wherein the processing device is at least one of a gardening, forestry, or construction processing device, and wherein the blocking criterion is that while the control element is operated, the generated torque driving the cutting tool is greater than zero, a current effecting the torque is greater than zero, at least one of a rotational speed of the electric motor drive system is equal to or less than the blocking rotational speed lower limit value or a rotational speed of the cutting tool is equal to or less than the blocking rotational speed lower limit value.

15. The hand-guided processing device of claim 14, wherein the blocking rotational speed lower limit value is zero.

* * * * *

UNITED STATES PATENT AND TRADEMARK OFFICE
CERTIFICATE OF CORRECTION

Page 1 of 1

PATENT NO. : 12,337,498 B2
APPLICATION NO. : 17/154753
DATED : June 24, 2025
INVENTOR(S) : Alexander Haas et al.

It is certified that error appears in the above-identified patent and that said Letters Patent is hereby corrected as shown below:

In the Claims

In Column 11, Claim 1, Line 7, delete "greater than".

In Column 13, Claim 14, Line 11, delete "greater than".

Signed and Sealed this
Twenty-fifth Day of November, 2025

John A. Squires
*Director of the United States Patent and Trademark Office*